Nov. 14, 1950 — N. FELICI — 2,530,193

ELECTROSTATIC MACHINE

Filed July 14, 1947 — 3 Sheets-Sheet 1

Noel Felici, Inventor

By Stebbins, Blenko & Webb, Attys.

Noel Felici, Inventor
By Stebbins, Blenko & Webb, attys

Noel Felici, Inventor
By Stebbins, Blenko & Webb, Attys.

Patented Nov. 14, 1950

2,530,193

UNITED STATES PATENT OFFICE 2,530,193

ELECTROSTATIC MACHINE

Noël Felici, Grenoble, France, assignor to Centre National de la Recherche Scientifique, Paris, France, an establishment of France Application July 14, 1947, Serial No. 760,896
In France July 17, 1946

21 Claims. (Cl. 171—329)

The present invention relates to electrostatic generating machines and particularly to such machines having a relatively small power.

In my co-pending application No. 646,737 filed February 11, 1946, now Patent No. 2,486,140, October 25, 1949, I have described an electrostatic machine comprising movable conducting members the active parts of which, contrary to the machines heretofore built, present a substantial thickness, the shape of said parts being chosen so as to provide for a good distribution of the electrostatic field, i. e., so that the said field remains, in each point of the surface of said parts, lower than or at most equal to the dielectric strength of the insulating medium in contact with said surface.

The object of the present invention is to provide an electrostatic machine of compact construction and comparatively small dimensions, capable of yielding high voltages for a small current output.

An electrostatic generating machine according to the present invention comprises a general frame formed of two spaced insulating supports, carrying between them stationary conducting members formed of cylindrical segments in even number, in which frame is rotatably mounted a shaft on which are secured at least one core made of an insulating material of low dielectric constant, preferably lower than 4, and carrying outwardly, facing the stationary conducting members, the movable conducting members of the machine, also formed of cylindrical segments, longitudinally divided into at least two groups each forming a rotor of the machine, i. e., at least one principal rotor and at least one auxiliary rotor. Each of the movable conducting members is electrically connected to a conducting sector co-operating with brushes connected, as concerns those corresponding to the members forming a principal rotor, alternately with the body of the machine constituted by a tight metallic casing containing a medium having a high dielectric strength and with an outlet lead insulated with respect to said body, and as concerns those corresponding members forming an auxiliary rotor, alternately with one of the stationary conducting members and with a point of the machine the potential of which is practically constant during the normal working of said machine. The active edges of the movable conducting members forming a principal rotor and the active edges of the stationary conducting members, at least where they face the active edges of said movable members, have a marginal thickness equal to at least two thirds of that of the layer of gas separating a stationary conducting member from a movable conducting member of the principal rotor when said members are at least partially face to face with one another.

The points of the machine to which are connected the alternate brushes co-operating with the members forming the principal rotor may be any point of the body of the machine and the insulated outlet lead.

Two embodiments of such a machine are described hereafter with reference to the appended drawings in which.

Figure 1:
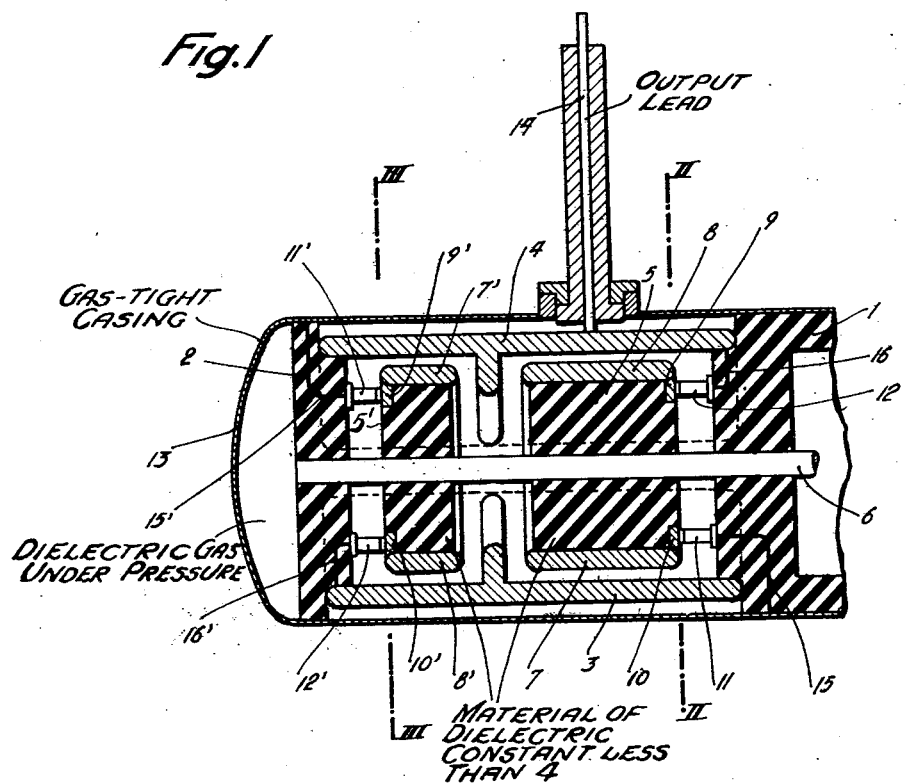
Figure 1 is a diagrammatic longitudinal sectional view of a generating machine according to the invention and comprising a single secondary or auxiliary rotor.

The stationary parts of the generating machine comprise two supports 1 and 2 made of insulating material and carrying conducting members 3 and 4, of semi-cylindrical shape made, for instance, of metal. Said conducting members delimit a cylindrical volume inside which the rotating members are located. The latter comprise a main rotor which supplies the electric energy to the receivers or load and one or more secondary or auxiliary rotors fastened on the same shaft and supplying the electrical energy for the excitation of the machine.

The main rotor comprises an insulating member of cylindrical shape 5 fastened on a shaft 6 and carrying outwardly two conducting members 7 and 8, of semi-cylindrical shape, for instance, made of metal. Said conducting members which are the electricity conveyors of the machine are connected electrically with conducting sectors 9 and 10 on which rub conducting brushes 11 and 12 which are connected one with the body or casing of the apparatus, consisting in a tight metallic cylinder 13 which is filled with compressed gas, and the other with an insulated outlet lead 14 for collecting the current supplied by the generating machine. Electric connections to the brushes 11 and 12 are provided by conductors 15 and 16 which may be, for example, wires having a sufficient diameter.

The secondary rotor or rotors comprise similar members, with a difference in size only, their dimensions lengthwise of the shaft being generally smaller. In the following description the corresponding members of the secondary rotors and of the main rotor will bear the same references which will be primed in the case of the secondary rotors.

One of the features of the invention resides in the fact that the stationary conducting members 3 and 4 and the conveyors 7 and 8 have, at least on their active edges, a thickness at least equal to two thirds of the thickness of the layer of gas separating a stationary conductor member from a conveyor when two such members are at least partially face to face with one another and the difference of potential between said members has the highest value it can have during a normal working cycle of the machine without discharge between the two members. However, in order to avoid unfavorable losses through sparks, brush discharges, coronae and the like, the said active edges are shaped, in a manner disclosed in said application Serial No. 646,737, so as to provide for a good distribution of the electrostatic field, as above mentioned. The maximum power is thus obtained, which is determined by the respective capacities of the stationary and movable conducting members, the dielectric strength of the compressed gas and the above mentioned thickness of the gas layer between the stationary and movable members.

Figure 8:
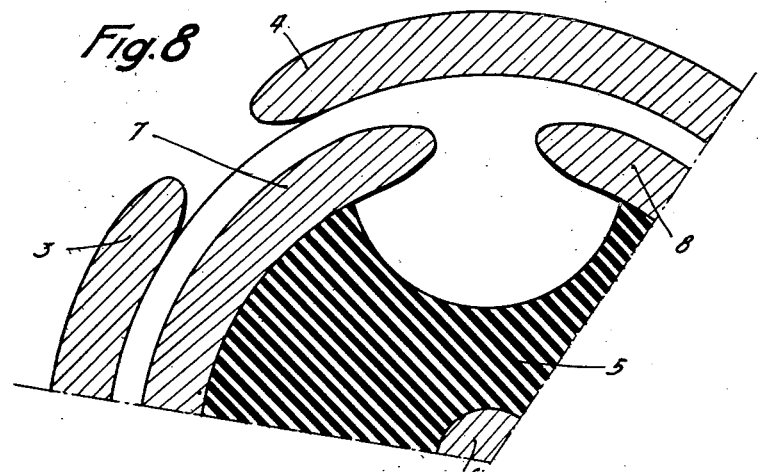
Figures 6, 7 and 8 are partial transverse sectional views showing different suitable shapes for the stationary and movable conducting members of machines according to the invention.
Figure 7:
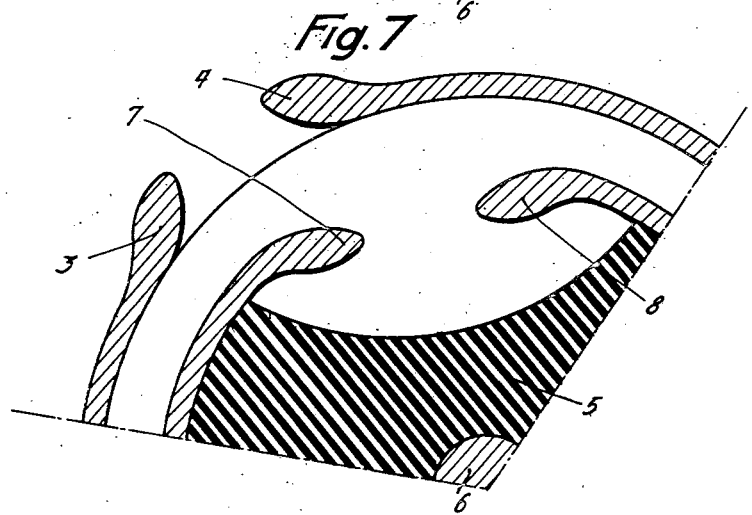
Figure 6:
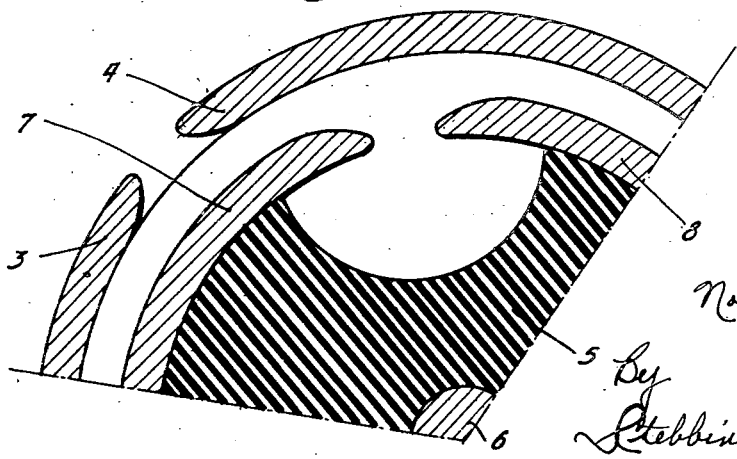

It will generally be advisable to give the stationary conducting members and the movable conducting members or conveyors a marginal thickness which is substantially equal to or larger than the above mentioned gas thickness, their active edges being, for instance, shaped as shown in Figure 6. Any thickness may be chosen for the regions of the conducting members away from the edges. If this thickness is chosen smaller than the necessary marginal thickness it will be necessary to thicken the member progressively on drawing near to the active edges, as shown in sectional view in Figure 7. If, on the contrary, the general thickness of the conducting members is chosen higher than the necessary marginal thickness, it is sufficient to give the edges a favourable shape such as that which is shown in sectional view in Figure 8. These rules relate, more particularly, to the main rotor and the stationary conducting members 3 and 4 in the regions where they are opposite said main rotor. When the secondary rotors are to supply only an insignificant power, as it is generally the case, it is not necessary that said rules be applied strictly to the same. It will be necessary, however, to give the conveyors 7', 8', 7'', 8'' a sufficient marginal thickness comparable with that which is given to the main conveyors 7 and 8.

Figure 2:
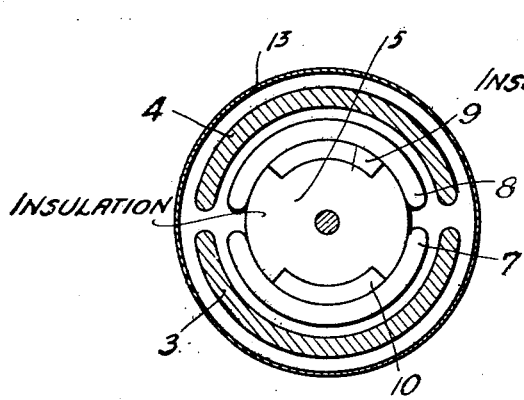
Figure 2 is a sectional view through II—II of Figure 1.
Figure 3:
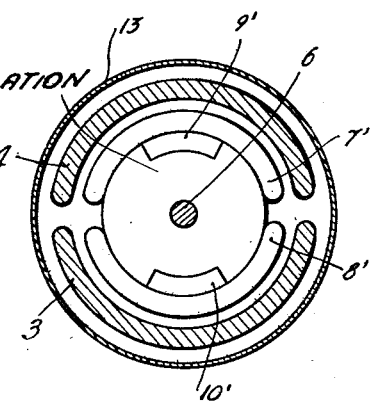
Figure 3 is a sectional view through III—III of Figure 1.

In the particular embodiment shown at Figures 1 to 3, the stationary conducting member 4 is connected to the delivery brush 12 by the wire 16 and to the insulated outlet lead 14 through direct contact. Brush 12' is connected to the stationary conducting member 3 by the wire 16' and the two brushes 11 and 11' are connected to the body by the wires 15 and 15'.

If 2U is the maximum difference of potential which it is desired shall exist, during a normal working, between the stationary conducting members 3 and 4 and the conveyors 7 and 8 when two of such members register at least partially, the stationary conducting member 3 is brought to a potential near ±U and acts as an inductor while the other stationary member 4 acts as a shield.

Under the influence of the stationary conducting member 3, the main conveyors 7 and 8 acquire charges during their rotation, through brush 11 and sectors 9 and 10, the sign of which charges is opposed to that of member 3, which charges are supplied by the body. The conveyors 7 and 8 respectively carry away said charges when the contact is broken between the sectors 10 and 9 and the brush 11 and their potential with respect to member 3 then rises. The sectors 9 and 10 afterwards come into contact with the brush 12 and transfer the charges on the conveyors to the outer receiver through the conducting chain formed of the brush 12, lead 16, member 4 and lead 14, the charges flowing through an external circuit back to the casing 13. This transfer is promoted by the conducting member 4 serving as a shield.

The secondary rotor works in the same manner, but, in this case, conducting member 4 plays the part of an inductor inducing a charge on the conveyors 7' and 8' when the latter are in conductive relation with the body 13 through the wire 15', the brush 11' and the conducting sectors 9' and 10' connected respectively with the conveyors 7' and 8', while the member 3 now plays the part of a shield promoting the discharge from the conveyors 7' and 8' and receiving the electricity carried by said conveyors through the brush 12' and the wire 16' which connects said brush 12' with the member 3. The secondary rotor thus constitutes an auxiliary generating machine or exciter which maintains the charge of conducting member 3 with a supply of electricity which compensates the losses sustained by said member and, moreover, the whole machine is spontaneously electrified as soon as it is rotated, thus insuring the starting of the generating machine.

Figure 5A:
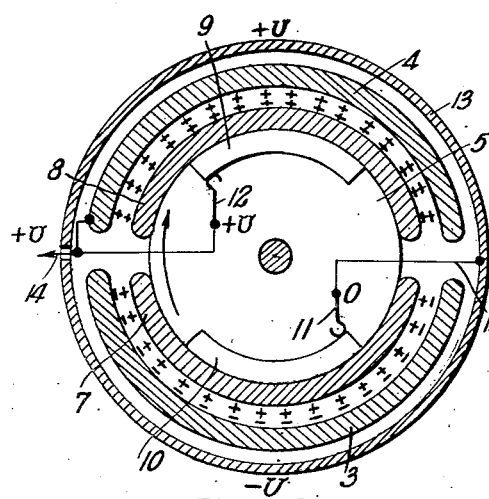
Figure 5A is a diagrammatic view similar to Fig. 2, on a slightly larger scale, showing the electrical connections and the charges on the various members of the machine at one rotor position.
Figure 5B:
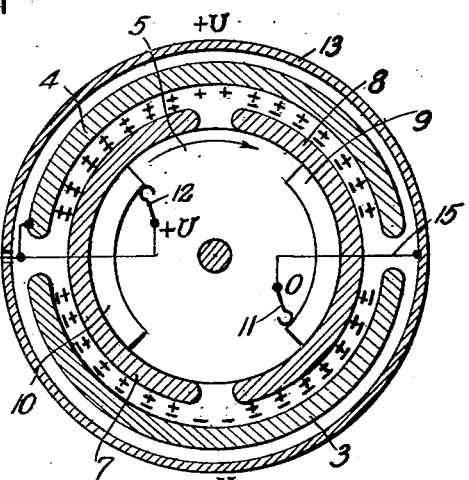
Figure 5B is a view similar to Figure 5A at another rotor position.

Figs. 5A and 5B correspond to the machine shown in Figs. 1, 2 and 3 and diagrammatically represent the relations of the conveyor members 7 and 8 to the stationary inductor members 3 and 4 in two positions in the rotation of the rotor 5. In Fig. 5A the conveyor member 7 is in full face to face relation with the inductor member 3 and forms therewith a condenser with a capacity C. The sector 10 electrically connected to the conveyor 7 is engaged by the brush 11 connected to the casing 13 which itself is grounded or may be considered to be at ground or zero potential. As described in connection with Fig. 1, the inductor member 3 by the operation of the exciter elements 7', 8' and the parts associated therewith is maintained at a potential of −U. The difference in potential between the conveyor member 7 and the inductor member 3, therefore, is U.

As shown in Fig. 5A, the sector 10 is about to break contact with the brush 11 and upon movement from the position shown in Fig. 5A, the conveyor 7 will be insulated and will retain and carry its charge without discharge thereof until the forward end of the sector 10 as the rotor 5 rotates in the direction of the arrow, Fig. 5A, comes in contact with the brush 12. During this movement of 90° to the position shown in Fig. 5B the capacity between the conveyor 7 and the inductor 3 is reduced to one-half of that existing in Fig. 5A. The potential difference between the conveyor 7 and the inductor 3, therefore, is doubled and becomes 2U. Thus, the potential of the conveyor 7 rises from zero to +U as it attains the position shown in Fig. 5B, the potential of the inductor 3 being constant at −U. Upon contact of the sector 10 with the brush 12 the charge carried by the conveyor 7 may be discharged to the terminal 14.

As shown in Fig. 5B the inductor 4 which serves as a shield also is connected to the terminal 14 and, therefore, its potential becomes the same as that of conveyor 7. Since there is no difference of potential between inductor 4 and the conveyor 7 as the conveyor 7 moves from the position shown in Fig. 5B to the position 90° therefrom directly opposite its original position in Fig. 5A, no charge is thereby induced on the conveyor 7.

During the movement of the conveyor 7 from the position shown in Fig. 5B to the position of 90° therefrom, the sector 10 remaining in contact with brush 12, the capacity of the conveyor 7 with respect to the inductor 3 is continuously reduced. As the charge carried by the conveyor 7 has not been diminished during the movement of the conveyor from the position of Fig. 5A to that of Fig. 5B before contact of sector 10 with brush 12, this charge may be continuously discharged through the terminal 14 during the further movement of the conveyor 7 from the position of Fig. 5B to the position at 90° therefrom in the direction of the arrow. This discharge to the terminal 14 continues until the capacity of the conveyor 7 with respect to the inductor 3 is reduced substantially to zero upon the conveyor 7 reaching the position directly opposite its original position in Fig. 5A and corresponding to that occupied by the conveyor 8 in Fig. 5A.

When the conveyor 7 has moved 90° from the position shown in Fig. 5B, the contact with brush 12 is broken. This conveyor is still at potential +U. It then begins to leave its position of full face to face relation with the screen 4 which also is at potential +U and to come in face to face relation with the inductor 3 which is at potential −U. When, after a further rotation of 90°, the conveyor 7 occupies the position shown for conveyor 8 in Fig. 5B, the capacity between screen 4 and conveyor 7 is equal to the capacity between inductor 3 and conveyor 7 so that the potential of the conveyor 7 is zero. At this moment, it is grounded through contact of sector 10 with brush 11.

In this position, after such contact with the brush 11 is effected, the conveyor 7 forms with the inductor 4 a capacity with the potential difference of U. This conveyor also now forms with the inductor 3 a capacity with a potential difference of U. Since these capacities are equal because of the equal lapping of the conveyor 7 on the inductors 4 and 3 and the potentials of these inductors are of opposite signs, the charges induced on the two parts of conveyor 7 offset each other. As the rotor is further rotated in the direction of the arrow with the brush 11 continuing in contact with the sector 10 its potential is maintained at zero. The capacity with respect to inductor 4 reduces to zero but the capacity of the conveyor 7 with respect to the inductor 3 increases until it reaches the full capacity as shown in Fig. 5A with the potential difference of U at which point the cycle starts to repeat.

It will be understood that the conveyor 8 electrically connected to its sector 9 is carried through precisely the same cycle as that described for conveyor 7 and in its turn effects discharge of its charge to terminal 14 at a potential of +U. It is brought to ground potential in the position shown in Fig. 5B and thereafter again builds up its charge with respect to the inductor 3 to repeat its cycle when it reaches the position shown for the conveyor 7 in Fig. 5A.

It is advisable to arrange the dimensions of the conducting sectors 9, 10, 9', 10' and the dimensions and positions of the brushes so that the contact of sector with brush will be established, when the generating machine is in normal working action, at the moment when the difference of potential between sector and brush is near zero. Thus sparks are avoided which are unfavorable to the good preservation of the apparatus, and which also cause a dissipation of electric energy which is prejudicial to the efficiency. For obtaining this result it is advisable to give the sectors an arcuate extent of the order of half the arc covered by a conveyor, that is to say about 80° to 90°. When the interference capacities are comparatively large, as is the case more particularly in the auxiliary rotor, it is advisable to take a smaller arcuate extent, 50° to 70° for example.

It is possible, without departing from the scope and spirit of the invention, to choose, for the stationary conducting members 3 and 4 and the movable conducting members 7, 8, 7' and 8' an arcuate extent different from 180° while always giving them a substantially cylindrical surface. It is possible, for instance, to give them an arcuate extent of $180°/n$ with $2n$ stationary conducting members in all and $2n$ conveyors on the principal rotor. The stationary conducting members may be connected electrically two by two so as to form two groups playing the same part as 3 and 4. The same will be true for the conveyors of each rotor. It will be advisable to give the conducting sectors on which the brushes rub an arcuate extent of about $180°/n$.

In the construction of the main rotor it is advisable to reduce as much as possible the interference capacities between shaft and conveyors as well as between the conveyors themselves, for said capacities reduce the power in an appreciable manner. To this end, it is important to use for the constitution of the core 5 an insulating material the dielectric constant of which is as low as possible and preferably lower than 4 and to hollow out this insulator as much as possible consistent with its mechanical strength.

Figure 4:
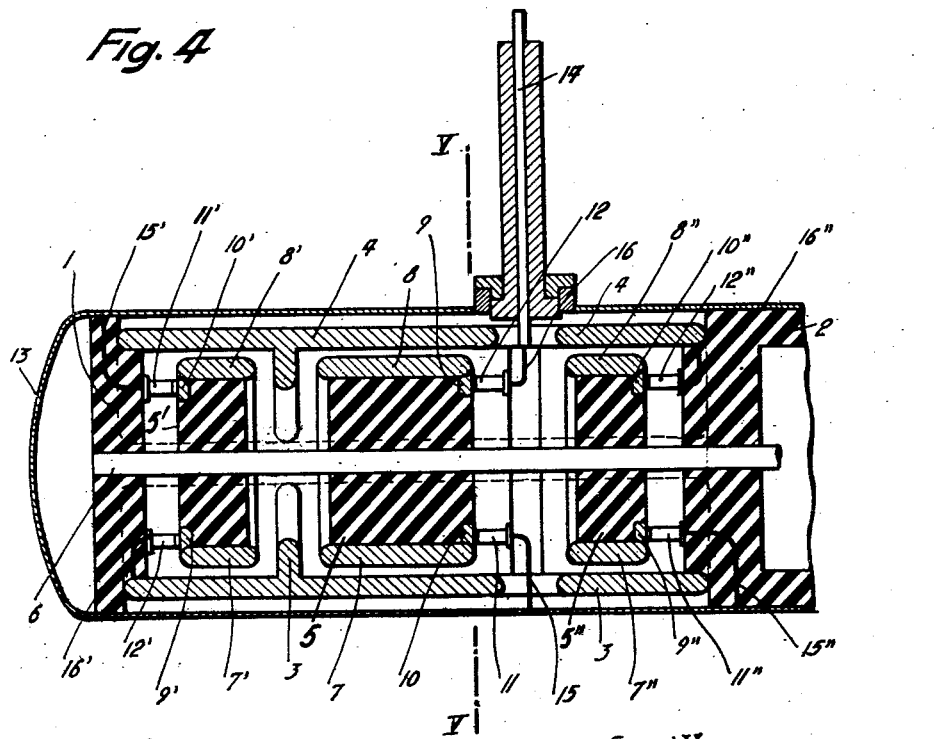
Figure 4 is a sectional view similar to that of figure 1 of a machine comprising two auxiliary rotors.

The generating machine shown at Figures 4 and 5 comprises, besides the principal rotor formed of the core 5 and the conveyors 7 and 8, two auxiliary rotors formed respectively of the cores 5' and 5'' and the conveyors 7' and 8', on one hand, and 7'' and 8'' on the other. The brushes 11 and 12 co-operating with the principal rotor are connected respectively, through wires 15 and 16, with the tight conducting casing 13 and with the insulated outlet lead 14. The brushes 11' and 12' co-operating with the first auxiliary rotor are connected respectively, by wires 15' and 16', with the casing 13 and with the stationary conducting member 3. Finally, the brushes 11'' and 12'' co-operating with the second auxiliary rotor are connected respectively, by wires 15'' and 16'', with the casing 13 and with the stationary conducting member 4. The second auxiliary rotor is hereinafter referred to as the ancillary rotor.

When the machine is operating, the stationary conducting member 3 is brought to a potential of around ±U, 2U having the same signification, as above, while the other stationary member 4 is brought to a potential near ∓2U. Under the influence of member 3 the conveyors 7 and 8 of the main rotor acquire through sectors 9 and 10 and the brush 11 a charge the sign of which is the opposite of that of the charge of member 3. They carry said charge away when the contact with brush 11 is broken and then come into conductive relation with the brush 12 connected with the insulated outlet lead 14. They then transfer through this brush and lead 14 to the outer circuit not only the charge previously stored but an additional charge of the same sign owing to the influence of member 4. The conveyors 7 and 8 thereby acquire a charge of the opposite sign. This new charge is carried away by the conveyors 7 and 8 when their connection with 12 is broken and then transferred to the body 13 through brush 11, and the cycle is repeated.

The secondary rotors work in a similar manner. For one of them, the member 4 which plays the part of an inductor, inducing a charge on the conveyors 7' and 8' when the latter are connected with the casing 13 through brush 11' at which time member 3 plays the part of a shield for said conveyors. The conveyors 7' and 8' are then discharged when they are in contact with the brush 12' connected with member 3. This auxiliary rotor thus constitutes an auxiliary generating machine which maintains the charge of member 3 through a supply of electricity. For the other auxiliary or ancillary rotor, the member 3 plays the part of an inductor inducing a charge on the conveyors 7" and 8" when they are connected with the body 13 through the brush 11", while member 4 plays the part of a shield promoting the discharge of the conveyors 7" and 8" thereto when they are in relation with brush 12" connected with member 4. This ancillary rotor thus constitutes a generating machine which maintains the charge of member 4. It would also be possible, instead of taking the charge of the conveyors 7" and 8" from the casing, to take it from the insulated outlet lead 14 of the generating machine.

It will be advisable, as in the previously described embodiment and for the same reasons, to give the conducting sectors 9 and 10 of the main rotor and the sectors 9', 10', 9" and 10" of the secondary rotors on which the brushes rub a suitable arcuate extent. It is also necessary to give the brushes a convenient position in order that during the usual working of the generating machine the contact of sector with brush is established at the moment when the potential difference between sector and brush is near zero. In order to obtain this result it is advisable to give the sectors of the main rotor an arcuate extent equal to about two thirds of the angle covered by a conveyor, that is to say, 110° to 120° in the case of Figures 4, 5A and 5B. As regards the sectors 9', 10', 9", 10" of the secondary rotors it will be necessary to give them a generally more reduced extent, more particularly when the interference capacities play an important part.

As previously, it will be possible to use, without departing from the scope and spirit of the invention, a plurality of pairs of stationary conducting members and/or conveyors. It will also be convenient to reduce, as much as possible, the interference capacities of the main rotor.

I claim:

1. An electrostatic generating machine comprising a frame formed of a pair of spaced insulating supports, stationary conducting members disposed between said spaced insulating supports and having an even number of cylindrical segments, a shaft rotatably mounted in said frame, at least one core composed of an insulating material of low dielectric constant secured to said shaft and rotatable therewith, at least one series of cylindrical segments equal in number to and facing the first-mentioned cylindrical segments and disposed about said core for rotation therewith, each such rotatable segment being connected to a conductive sector on said core and cooperating with a first series of fixed brushes comprising an even number, a gas-tight pressure-resistant metallic casing enclosing said machine, an insulated outlet lead passing through said casing, electrical connections between said casing and the alternate, odd-numbered brushes and between alternate, even-numbered brushes and said outlet lead, and at least one additional series of similar cylindrical segments mounted on said shaft for rotation with the above-mentioned rotatable segments but electrically separated therefrom, each of said additional segments being connected to a conducting sector rotatable therewith, and cooperating with a second series of fixed brushes comprising an even number, certain alternate brushes of said second series being connected with one of the stationary conducting members and the other brushes of said second series being connected to the casing, the active edges of the rotatable conducting members and the active edges of the stationary conducting members having a marginal thickness equal to at least two-thirds the space between a rotatable and a stationary conducting member when said members are at least partially facing each other.

2. An electrostatic machine according to claim 1, in which the dielectric constant of the material forming the core secured on the rotatable shaft is less than 4.

3. An electrostatic machine according to claim 1, in which every other brush cooperating with the movable conducting members forming a principal rotor is electrically connected to the casing of the machine.

4. An electrostatic machine according to claim 1, in which every other brush cooperating with the movable conducting members forming a principal rotor is electrically connected to the insulated outlet lead.

5. An electrostatic machine according to claim 1, including at least four stationary conducting members and four movable conducting members for the principal rotor and in which alternate conducting members belonging to the same group are electrically connected together to provide that group with two functionally similar series of members.

6. An electrostatic machine according to claim 1, in which the active edges of the principal movable conducting members have a predetermined shape maintaining the electrostatic field, in each point of the surface of said edges not greater than the dielectric strength of the insulating medium in contact with said surface in said point.

7. An electrostatic machine according to claim 1, in which the active edges of the additional series of movable conducting members have a thickness of the same order of magnitude as that of the principal movable conducting members.

8. An electrostatic machine according to claim 1, in which the conducting sectors connected with each movable conducting member are given such an arcuate extent, and the brushes such a position, that the contact between each sector and each brush is established at the moment when the difference of potential between sector and brush is near zero.

9. An electrostatic machine according to claim 1, in which there is only a single auxiliary rotor and in which the arcuate extent of the conducting sectors connected with each movable conducting member is at most of the order of half the arcuate extent of the corresponding conducting member.

10. An electrostatic machine according to claim 1, in which there are two auxiliary rotors and in which the arcuate extent of the conducting sectors connected with each movable conducting member is at most of the order of two thirds of the arcuate extent of the corresponding conducting member.

11. An electrostatic machine according to claim 1, in which there is only a single auxiliary rotor, and in which the brush cooperating with the principal rotor and which is not connected to the casing of the machine is connected to the outlet lead through one of the stationary conducting members.

12. In an electrostatic generator, a pair of spaced insulating supports, a shaft rotatably mounted in said supports, a pair of substantially semi-cylindrical metallic inductor members spanning and supported by said supports and arranged to form a cylindrical chamber concentric with said shaft, a main rotor secured to and rotatable with said shaft within said chamber, at least one auxiliary rotor also mounted on and rotatable with said shaft within said chamber, each said rotor including a pair of substantially semi-cylindrical metallic conveyor members concentric with said shaft, said main and auxiliary rotors being spaced from said supports and from each other along said shaft, two pairs of conducting brushes, said pairs of brushes respectively being supported adjacent said rotors for electrical connection to said conveyor members in succession during rotation of said rotors, a gas tight pressure resisting metallic casing enclosing said supports, said conducting members and said rotors, a terminal, means for electrically connecting one brush of each pair with said metallic casing, means for connecting the other brush of one pair to said terminal, and means for connecting the other brush of the other pair to one of said inductor members.

13. An electrostatic generator of the character defined by claim 12 in which said main rotor includes a cylindrical core of a material of low dielectric constant secured on said shaft, said pair of semi-cylindrical metallic conveyor members of said main rotor being carried upon the periphery of said core, and a pair of arcuate conducting sectors disposed on the end face of said core opposite the adjacent support and located radially inwardly with respect to the conveyor members on said core, said conducting sectors being adapted to make contact in succession during rotation of said rotor with the conducting brushes disposed between said core and the adjacent support.

14. An electrostatic generator of the character defined by claim 12 in which each auxiliary rotor includes a cylindrical core of a material of low dielectric constant secured on said shaft, said pair of semi-cylindrical conveyor members of said auxiliary rotor being carried upon the periphery of said core, and a pair of arcuate conducting sectors disposed on the end face of said core opposite the adjacent support and located radially inwardly with respect to the auxiliary conveyor members on said core, said conducting sectors being adapted to make contact in succession during rotation of said rotor with the conducting brushes disposed between said core and the adjacent support.

15. An electrostatic generator of the character defined by claim 12 in which the main rotor and each auxiliary rotor includes a cylindrical core of a material of low dielectric constant secured on said shaft, said pair of semi-cylindrical conveyor members of each rotor being carried upon the periphery of said core, and a pair of arcuate conducting sectors disposed on an end face of each core opposite the adjacent support and located radially inwardly of and connected to the conveyor members on said core, said conducting sectors being adapted to make contact in succession during rotation of said rotors with the conducting brushes disposed between said cores and the adjacent supports.

16. In an electrostatic machine, at least one conductive inductor electrode and at least a pair of conductive conveyor electrodes, the electrodes of said pair being disposed in spaced relation circumferentially about a common axis, each of said inductor and conveyor electrodes having a surface extending circumferentially about said axis and also extending parallel to said axis to provide a substantial area of said surface, each said surface extending between edges of convex form and circumferentially spaced from the adjacent edges of adjacent electrodes sufficiently to prevent electrostatic discharge therebetween and being of substantial thickness at least adjacent said edges, means for supporting said inductor and conveyor electrodes for relative rotation thereof to produce circumferential movement of said inductor and conveyor electrodes in inductive relation with respect to each other, means for confining a gaseous dielectric material under pressure in contact with and between said spaced electrodes, a brush supported for connection to each of said conveyor electrodes in succession in the relative movement thereof with respect to said inductor electrodes, means for maintaining a predetermined difference of potential between said brush and one of said inductor electrodes, a discharge terminal, and a second brush connected to said discharge terminal and supported in spaced relation to said first brush circumferentially about the axis of rotation for connection to said conveyor electrodes in succession.

17. In an electrostatic machine, at least a pair of outer conductive electrodes and at least a pair of inner conductive electrodes, the electrodes of each pair being disposed concentrically at opposite sides of a common axis, each electrode having a surface extending circumferentially about said axis and also extending parallel to said axis to provide a substantial area of said surface, each said surface extending between edges of convex form and circumferentially spaced from the adjacent edges of adjacent electrodes sufficiently to prevent electrostatic discharge therebetween, each electrode being of substantial thickness at least adjacent said edges, means supporting said pairs of electrodes for relative rotation upon said axis in inductive relation of one pair with respect to the other, a metallic housing enclosing said electrodes and confining a gaseous dielectric material under pressure in contact with and between said electrodes, a discharge terminal insulated from said housing, means including at least a pair of circumferentially spaced brushes for connecting each electrode of one pair alternately to the housing and to the terminal during said relative rotation, and means for maintaining the other pair of said electrodes respectively at potentials differing in opposite senses with respect to the potential of said housing.

18. In an electrostatic machine, at least a pair of stationary conductive electrodes disposed at opposite sides of a common axis and each having a surface extending circumferentially about said axis and also extending parallel to said axis to provide a substantial area of said surface, said electrodes having a substantial thickness at least adjacent the circumferentially spaced edges thereof, said circumferentially spaced edges of the stationary electrodes being of convex form and being adjacent but separated from the adjacent edges of the adjacent electrodes sufficiently to prevent electrostatic discharge therebetween, means for maintaining at least a given one of said electrodes at a predetermined potential, at least a pair of movable conductive electrodes similar in cross-sectional form to said stationary electrodes, means for supporting said movable conductive electrodes at opposite sides of said axis and for rotation together upon said axis, said stationary electrodes and said movable electrodes being of similar circumferential extent and being formed and arranged in spaced relation of said surfaces thereof for movement of said movable electrodes generally parallel to said stationary electrodes upon rotation thereof on said axis, means for confining a gaseous dielectric material under pressure in contact with and between said spaced electrodes, a brush supported for electrical connection to each of said movable electrodes in succession in said rotation thereof, means for maintaining said brush at a predetermined potential different from the potential of said given stationary electrode, a discharge terminal, and a second brush connected to said discharge terminal and supported in spaced relation to said first brush circumferentially about said axis for electrical connection to said movable members in succession.

19. In an electrostatic machine as defined in claim 18, an auxiliary pair of movable conductive electrodes disposed at opposite sides of said axis and supported by said supporting means for rotation upon said axis together with said first movable electrodes in spaced relation of the surfaces thereof with respect to said stationary electrodes, an auxiliary brush supported for electrical connection to said auxiliary electrodes in succession in said rotation thereof, means for maintaining said auxiliary brush at a predetermined potential, and a second auxiliary brush supported in spaced relation to said first auxiliary brush about said axis of rotation and for electrical connection to said auxiliary movable electrodes in succession, said second auxiliary brush being connected to one of said stationary electrodes.

20. In an electrostatic machine as defined in claim 19, an ancillary pair of movable electrodes disposed at opposite sides of said axis and supported by said supporting means for rotation with said first pair and said auxiliary pair of movable electrodes in spaced relation of the surfaces thereof with respect to said stationary electrodes, an ancillary brush supported for electrical connection to said ancillary electrodes in succession in the rotation thereof about said axis, means for maintaining said ancillary brush at a predetermined potential, and a second ancillary brush supported in spaced relation about said axis from said first ancillary brush and for electrical connection to said ancillary movable electrodes in succession in the rotation thereof, said second ancillary brush being connected to the other of said pair of stationary electrodes.

21. In an electrostatic machine, a pair of conductive field electrodes and two pairs of conductive armature electrodes, the electrodes of each pair being disposed at opposite sides of a common axis, each electrode having a substantial surface area, each pair of said electrodes having circumferentially spaced edges of convex cross-section and spaced sufficiently to prevent electrostatic discharge therebetween and being of substantial thickness at least adjacent said edges, means supporting said armature and field electrodes for relative rotation therebetween with the surfaces of said field electrodes in opposed spaced relation to the surfaces of both pairs of armature electrodes, a metallic housing enclosing said electrodes and confining a gaseous dielectric material under pressure in contact with and between said electrodes, a discharge terminal insulated from said housing, means including a pair of circumferentially spaced brushes for alternately connecting one pair of said armature electrodes respectively to the housing and to said terminal during said relative rotation, means including the other pair of armature electrodes for maintaining a potential difference between the housing and one of the field electrodes so that said field electrode potential differs from that of the housing in an opposite sense to that of said terminal, and means for maintaining the other field electrode at a potential differing from that of the housing in the same sense as that of said terminal.

NOËL FELICI.

REFERENCES CITED

The following references are of record in the file of this patent:

UNITED STATES PATENTS

| Number | Name | Date |
| --- | --- | --- |
| 324,010 | Clarke | Aug. 11, 1885 |
| 1,283,492 | Frost | Nov. 5, 1918 |
| 2,194,839 | Van de Graaff et al. | Mar. 26, 1940 |